United States Patent
Yano et al.

(10) Patent No.: US 8,107,896 B2
(45) Date of Patent: *Jan. 31, 2012

(54) DATA TRANSMISSION METHOD FOR A MOBILE COMMUNICATION SYSTEM

(75) Inventors: Takashi Yano, Tokorozawa (JP); Satoshi Tamaki, Kokubunji (JP); Seishi Hanaoka, Kodaira (JP); Takeshi Kato, Akishima (JP)

(73) Assignee: Hitachi, Ltd., Tokyo (JP)

( * ) Notice: Subject to any disclaimer, the term of this patent is extended or adjusted under 35 U.S.C. 154(b) by 881 days.

This patent is subject to a terminal disclaimer.

(21) Appl. No.: 12/068,681

(22) Filed: Feb. 11, 2008

(65) Prior Publication Data

US 2008/0144594 A1    Jun. 19, 2008

Related U.S. Application Data

(63) Continuation of application No. 10/636,696, filed on Aug. 8, 2003, now Pat. No. 7,356,004.

(30) Foreign Application Priority Data

Mar. 3, 2003   (JP) .................................. 2003-055096

(51) Int. Cl.
*H04B 7/02* (2006.01)
*H04M 1/00* (2006.01)

(52) U.S. Cl. ...................... 455/101; 455/102; 455/562.1

(58) Field of Classification Search .................. 455/101, 455/91, 102, 103, 132, 137, 140, 269, 272, 455/279.1; 370/328, 334, 310
See application file for complete search history.

(56) References Cited

U.S. PATENT DOCUMENTS 6,058,105 A * 5/2000 Hochwald et al. ............ 370/310
(Continued)

FOREIGN PATENT DOCUMENTS

JP    2001-333051 A    11/2001
(Continued)

OTHER PUBLICATIONS

H. Kimura et al., "On performance of FEC in E-SDM", IEICE Technical Report, Japan, The Institute of Electronics, Information and Communication Engineers, Mar. 6, 2003, pp. 1-6. vol. 102, No. 675, RCS2002-307.

(Continued)

*Primary Examiner* — Sonny Trinh
(74) *Attorney, Agent, or Firm* — Mattingly & Malur, PC

(57) ABSTRACT

This invention provides a mobile communication system which expanded the operation limitation of the heretofore adopted mobile communication systems and improved the spectrum efficiency greatly. A data transmission method for use in the mobile communication system of the present invention includes means for channel pluralizing by which to expand the Shannon limit and means for interference reduction by which to expand the interference limit. More specifically, a transmitting module comprises M units of modulators and L units of transmitting antennas, generates L units of signals by multiplying M units of modulated signals by a complex matrix consisting of M×L units of elements, and transmits the L units of signals from the L units of transmitting antennas.

9 Claims, 17 Drawing Sheets

U.S. PATENT DOCUMENTS

| | | | |
|---|---|---|---|
| 6,678,263 B1 | 1/2004 | Hammons et al. | |
| 6,760,388 B2 * | 7/2004 | Ketchum et al. | 375/295 |
| 6,788,250 B2 | 9/2004 | Howell | |
| 7,010,053 B2 | 3/2006 | El-Gamal et al. | |
| 7,042,956 B2 | 5/2006 | El-Gamal et al. | |
| 7,069,050 B2 * | 6/2006 | Yoshida | 455/562.1 |
| 7,109,919 B2 | 9/2006 | Howell | |
| 7,194,237 B2 * | 3/2007 | Sugar et al. | 455/39 |
| 7,203,519 B2 * | 4/2007 | Ylitalo | 455/562.1 |
| 7,421,039 B2 * | 9/2008 | Malaender et al. | 375/304 |
| 7,786,934 B2 * | 8/2010 | Hwang et al. | 342/373 |
| 7,787,554 B1 * | 8/2010 | Nabar et al. | 375/267 |
| 2002/0027956 A1 | 3/2002 | Lee et al. | |
| 2002/0106989 A1 | 8/2002 | Aizawa et al. | |
| 2003/0021354 A1 | 1/2003 | Ghavami et al. | |
| 2003/0152159 A1 | 8/2003 | Denno | |
| 2004/0002364 A1 | 1/2004 | Trikkonen et al. | |

FOREIGN PATENT DOCUMENTS

| | | |
|---|---|---|
| JP | 2002-51030 A | 2/2002 |
| JP | 2003-18058 A | 1/2003 |
| WO | 02/082689 A2 | 10/2002 |

OTHER PUBLICATIONS

K. Miyashita et al., "Eigenbeam-Space Division Multiplexing (E-SDM) in a MIMO Channel", IEICE Technical Report, Japan, The Institute of Electronics, Information and Communication Engineers, May 24, 2002, pp. 13-18, vol. 102, No. 86, RCS2002-53.

* cited by examiner

FIG. 6
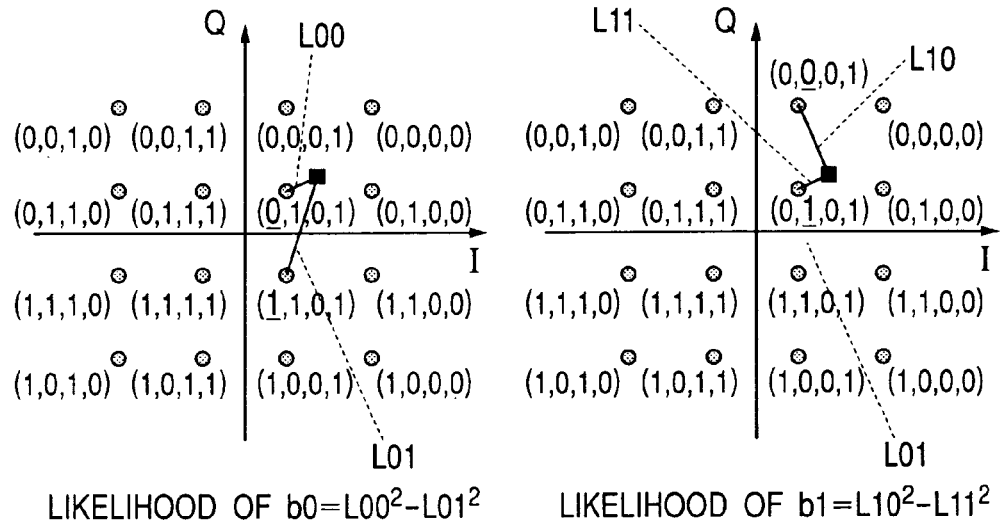
LIKELIHOOD OF b0=L00²−L01²    LIKELIHOOD OF b1=L10²−L11²
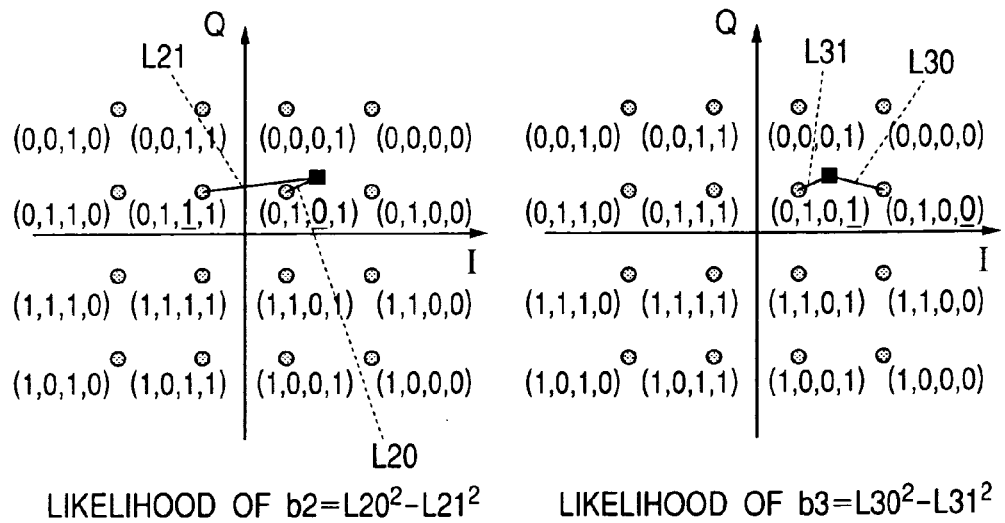
LIKELIHOOD OF b2=L20²−L21²    LIKELIHOOD OF b3=L30²−L31²

DATA TRANSMISSION METHOD FOR A MOBILE COMMUNICATION SYSTEM

RELATED APPLICATIONS

This is a continuation application of U.S. patent application Ser. No. 10/636,696, filed on Aug. 8, 2003, now U.S. Pat. No. 7,356,004, the contents are incorporated therein.

This application claims priority to JP 2003-055096, filed Mar. 3, 2003.

BACKGROUND OF THE INVENTION

1. Field of the Invention

The present invention relates to a data transmission method in a mobile communication system.

2. Description of Related Art

Since an Advanced Mobile Phone Service (AMPS) was started in the United States at the beginning of 1980s, and since an automobile telephone service was started in major cities of Japan, the number of cellular mobile users has so far multiplied dramatically. Accordingly, mobile communication systems were required to have a large capacity enough to accommodate a great number of users and analog cellular services using a large-capacity backbone network were launched in 1988. These analog cellular services are called the first generation (1G). Thereafter, digital cellular mobile telephone services based on Time Division Multiple Access (TDMA), positioned as the second generation, were started in the early 1990s. In Europe, a Global System for Mobile Communications (GSM) was started in 1991. In Japan, a Personal Digital Cellular (PDC) service was started in 1993. In the United States, a Digital AMPS (D-AMPS) (IS-54) was launched in 1993. These 2G systems led to the current prosperity of mobile communications. Somewhat later, an IS-95 (cdmaOne) system which adopted Code Division Multiple Access (CDMA) was put into practical use, and the IS-95 service was launched in South Korea and the United States in 1996 and also in Japan in 1998. Some calls the IS-95 based systems the second and a half generation (2.5G) to differentiate them from the second generation (2G) TDMA systems. In October, 2001, a W-CDMA service, which is a system of IMT-2000, positioned as the third generation (3G), was launched in Japan.

Active efforts toward the next generation mobile communications, the fourth generation mobile communications (4G) are also being made and a goal of realizing mobile communications in a 100 Mbps cellular environment has come to be recognized widely. The communication rate of 100 Mbps is about 100 times as faster as the IMT-2000 and it is an important challenge how to achieve such a high transmission rate in as narrow a frequency band as possible in order to make effective use of finite resources of radio frequencies.

Spectrum efficiency, the term which will be used hereinafter, is defined as follows. Through the use of total bit rate R per cell (or sector if the system is divided into sectors) and system frequency bandwidth W which is used in expanding service area on to surface, a ratio of R/W is referred to as the spectrum efficiency. If a 1-Hz frequency band is assigned to a mobile communication system, this spectrum efficiency corresponds to a maximum bit rate allowed for a user who occupies one cell or sector. Enhancing the R/W ratio means enhancing the maximum bit rate that the system can provide to users.

When viewing the above mobile communication systems which have heretofore been adopted by a measure of the spectrum efficiency, it will be understood that the spectrum efficiency R/W has been improved more as the generation advances, as is shown in FIG. 16. Also, it is indicated here that the spectrum efficiency improvement so far made to the mobile communication systems has a close relation to reduction in Eb/No required for the mobile communication systems. Eb denotes energy required to transmit one bit of data to be communicated and No denotes noise power density in the frequency band. It is reasonable that the reduction in the required Eb/No was achieved mainly by the following technologies: digitizing for 2G, CDMA and Viterbi code adopted for 2.5G, and Turbo code adopted for 3G.

Further spectrum efficiency improvement is expected for 4G to be made by new technologies which have not been utilized positively in the 3G and earlier mobile communication systems. One of such technologies is utilizing adaptive array antennas. A signal transmission method using the adaptive array antennas is depicted in FIG. 17. At the transmitting end, data to transmit is channel encoded 100 and modulated 100 and the modulated transmit signal is multiplied by M units of complex weight factors, and thereby transmit beams are generated (102). The beams are transmitted from M units of transmitting antennas (103-1 through 103-M). Each factor by which the transmit signal is multiplied during the beam forming 102 and the positions of the transmitting antennas (103-1 through 103-M) determine the pointing directions of the transmit beams. By controlling the pointing directions, the transmit beams can be configured to make radio beam emission power strongest in the direction toward the target receiver. At the receiving end, signals received by N units of receiving antennas (104-1 through 104-N) which are arranged in an array are multiplied by complex weight factors and added and combined (105). Each factor by which the received signals are multiplied during the beam forming 105 and the positions of the receiving antennas (104-1 through 104-N) determine the pointing directions of receiving beams. By controlling the pointing directions, the receiving beams can be configured to make radio beam receiving power strongest in the direction from the particular transmitter and relatively suppress radio beam receiving power in other directions. Thereby, the desired radio beam is made strong against interference beams.

Another one of the above-mentioned new technologies is utilizing Multiple-Input Multiple-Output (MIMO) propagation channels. A signal transmission/reception method using the MIMO channels is depicted in FIG. 18. Data to transmit is channel encoded 100 into M units of different signals which are then respectively modulated by modulators (101-1 through 101-M) and transmitted from a plurality of transmitting antennas (103-1 through 103-M) which are arranged in an array. The M units of transmit signals are mixed complexly through the propagation channels and come to the receiving end. At the receiving end, signals received by N units of receiving antennas (104-1 through 104-N) which are arranged in an array are multiplied by a complex matrix of M rows by N columns (108), and thereby M units of signals are obtained. By configuring the complex matrix such that the signals mixed through the above propagation channels are separated each other, the signals corresponding to the signals modulated by the modulators 101-1 through 101-M can be output from the MIMO receiver 108. Then, the M units of signals are respectively demodulated by demodulators 106-1 through 106-M and decoded by a channel decoder 107, and thereby received data is obtained. In the above-described method, the M units of different signals can be transmitted in parallel on the channels of the same radio frequency and communication with a high spectrum efficiency is considered achievable.

However, in fact, spectrum efficiency improvement to a great degree cannot be expected by applying the above-discussed technologies to mobile communication. There is a theoretical limitation to the spectrum efficiency, which is called a Shannon limit. As is shown in FIG. 1, the spectrum efficiency achieved by the third generation W-CDMA system comes near to the Shannon limit. For further spectrum efficiency improvement, the operation point must be moved such that Eb/No increases with increase in R/W in the graph of FIG. 1. However, because of the presence of interference from other cells and sectors in mobile communication environment, there is a limitation by interference (an interference limit curve shown in FIG. 1) in addition to the Shannon limit. It is indicated that the W-CDMA has achieved the spectrum efficiency near to the maximum spectrum efficiency within the limitation of mobile communication system operation defined by both the Shannon limit and the interference limit. In order to achieve further spectrum efficiency improvement, technology for expanding these limits is necessary.

Application of the foregoing array antennas can make the desired radio beam strong against the interference beams and, therefore, this can make the level of the interference limit up. Accordingly, the system operation limitation is expanded. However, as indicated by the Shannon limit curve shown in FIG. 1, R/W sharply rises when Eb/No increases up to 10 dB, but its rise becomes a little as Eb/No further increases from 10 dB to 40 dB. This indicates that powerful action for reducing interference is required to make a great improvement to the spectrum efficiency by the adaptive array antennas.

On the other hand, the foregoing MIMO channels enable configuring a plurality of channels (channel pluralizing) and, therefore, this can expand the Shannon limit of the previous systems using a single channel in the R/W up direction in the graph of FIG. 1. Thus, the effect of improvement to the spectrum efficiency appears to be great. However, because there is also the foregoing interference limit in mobile communication environment, the system operation available range defined by both the interference limit and the Shannon limit is not improved much after all even if the Shannon limit is expanded and the mobile communication system cannot take advantage of the effect using the MIMO channels.

SUMMARY OF THE INVENTION

It is therefore a first object of the present invention to provide a mobile communication system which expands the foregoing system operation limitation effectively and improves the spectrum efficiency greatly. A second object of the present invention is to control the operation point represented by the R/W vs. Eb/No curve in the graph of FIG. 1 appropriately by tracking propagation channels which change in real time as mobile terminals move.

The present invention can provide a data transmission method by which the spectrum efficiency was greatly improved as compared with the data transmission methods carried out in mobile communication systems through the application of the previous technologies. Also, the invention can provide a data transmission method in which modulation modes and transmission rates are controlled appropriately for dynamic change of propagation channels.

In order to solve the above-described problems, a data transmission method for use in a mobile communication system of the present invention includes means for channel pluralizing by which to expand the above-mentioned Shannon limit and means for interference reduction by which to expand the above-mentioned interference limit. More specifically, a transmitting module at the transmitting end comprises M units of modulators and L units of transmitting antennas, generates L units of signals by multiplying M units of modulated signals by a complex matrix consisting of M×L units of elements, and transmits the L units of signals from the L units of transmitting antennas.

In order to achieve the foregoing second object of the present invention, the transmitting module comprises a channel encoding means, a buffer means, M units of modulation means, and L units of transmitting antennas, stores a code word encoded by the channel encoding means into the buffer means, serially reads part of the code word from the buffer means until a receiving acknowledge signal has been returned from the receiving end, modulates the part of the code word by the above M units of modulation means, generates L units of signals by multiplying M units of modulated signals by the complex matrix consisting of M×L units of elements, and transmits the L units of signals from the L units of transmitting antennas. A receiving module at the receiving end comprises N units of receiving antennas, M units of demodulation means, buffer means, and a channel decoding means, each time receiving part of a code word, serially stores the part of the code word into the buffer, sequentially executes channel decoding of the received signals thus stored, and returns the receiving acknowledge signal to the transmitting end when the signals are decoded normally.

BRIEF DESCRIPTION OF THE DRAWINGS

FIG. 6 is a diagram to explain the operation of demodulators in the present invention;

DETAILED DESCRIPTION OF THE PREFERRED EMBODIMENTS

Figure 2:
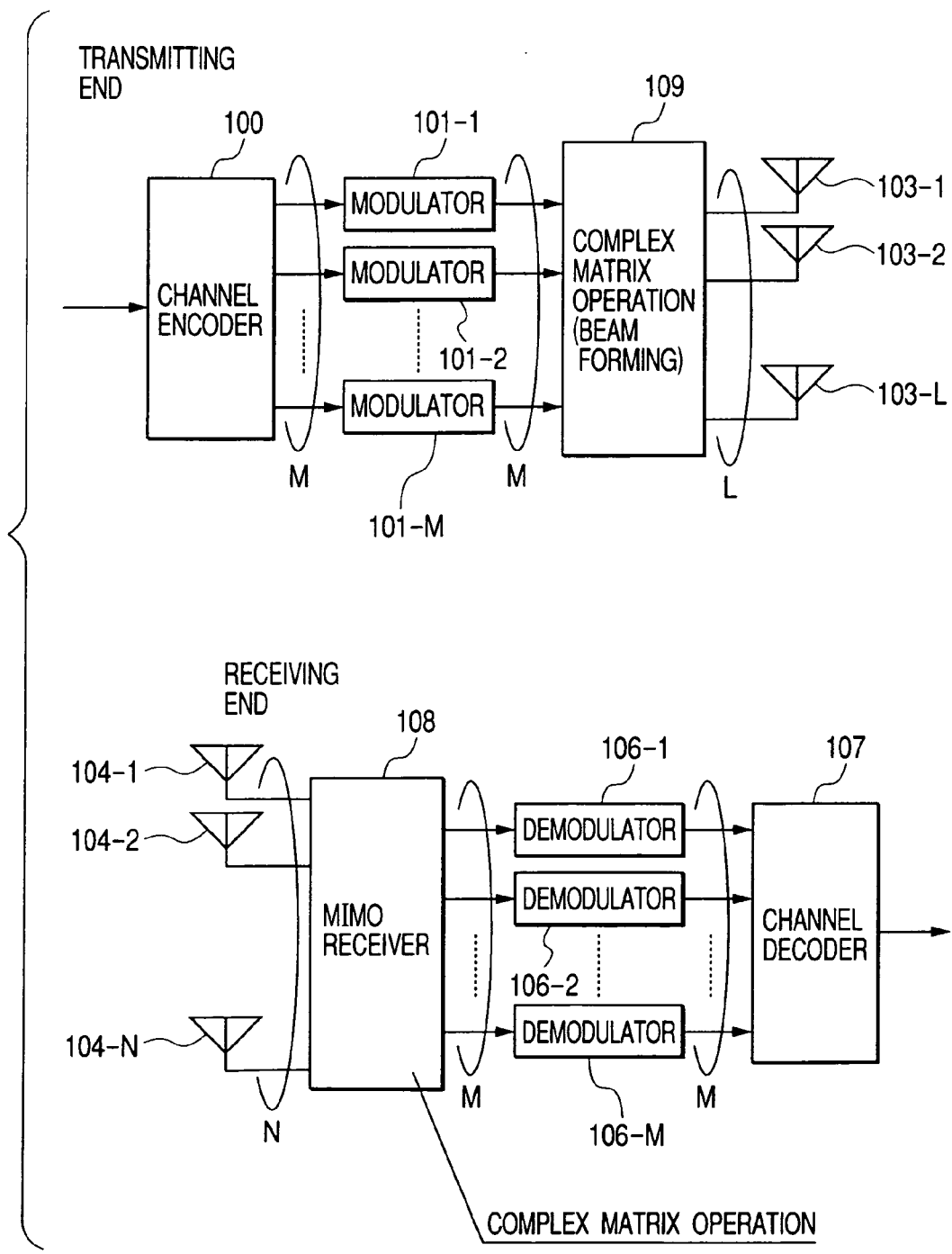
FIG. 2 is a diagram showing the configurations of transmitting and receiving modules in a mobile communication system according to a preferred Embodiment 1 of the present invention.

FIG. 2 shows the configurations of transmitting and receiving modules in a mobile communication system according to a preferred Embodiment 1 of the present invention. A transmit signal is channel encoded by a channel encoder 100 and serial-parallel converted into M units of signals. These M units of signals are modulated by modulators 101-1 through 101-M into M units of complex modulated signals (modulated symbols). The modulators 101-1 through 101-M may perform multilevel modulation if appropriate. In view of reduced circuitry scale, it may also be preferable to configure the transmitting module such that a serial-parallel converter which is present at the output of the channel encoder in this embodiment is moved to the post stage of a single modulator. The single modulator modulates transmit signals serially into M units of complex modulated signals (modulated symbols) and the serial modulated signals are serial-parallel converted into signals to be supplied to a complex matrix operation unit which will be described later. These M units of complex modulated signals (modulated symbols) are multiplied by a complex matrix consisting of M×L units of complex factors in the complex matrix operation unit 109 and thereby L units of complex signals are obtained. The L units of complex signals are transmitted by L units of transmitting antennas 103-1 through 103-L. At this time, the M-units of modulated signals are beam formed in the complex matrix operation unit 109 so that the L units of signals multiplied with different complex weight factors are transmitted in parallel from the L-units of transmitting antennas. At the receiving end, N units of signals received through N units of receiving antennas 104-1 through 104-N are multiplied by a complex matrix consisting of N×M units of complex factors in a MIMO receiver 108 and thereby M units of complex signals (received symbols) are obtained. The M units of complex signals (received symbols) are respectively demodulated by demodulators 106-1 through 106-M into M units of demodulated signals. The M units of demodulated signals are input to a channel decoder 107, channel decoded, and output as received data. In view of reduced circuitry scale, it may also be preferable to configure the receiving module such that the above M units of complex signals (received symbols) are demodulated serially by a single modulator into M units of demodulated signals which are in turn serially supplied to the above channel decoder 107. Here, either of the transmitting end and the receiving end may be either a base station or a mobile station.

Figure 14:
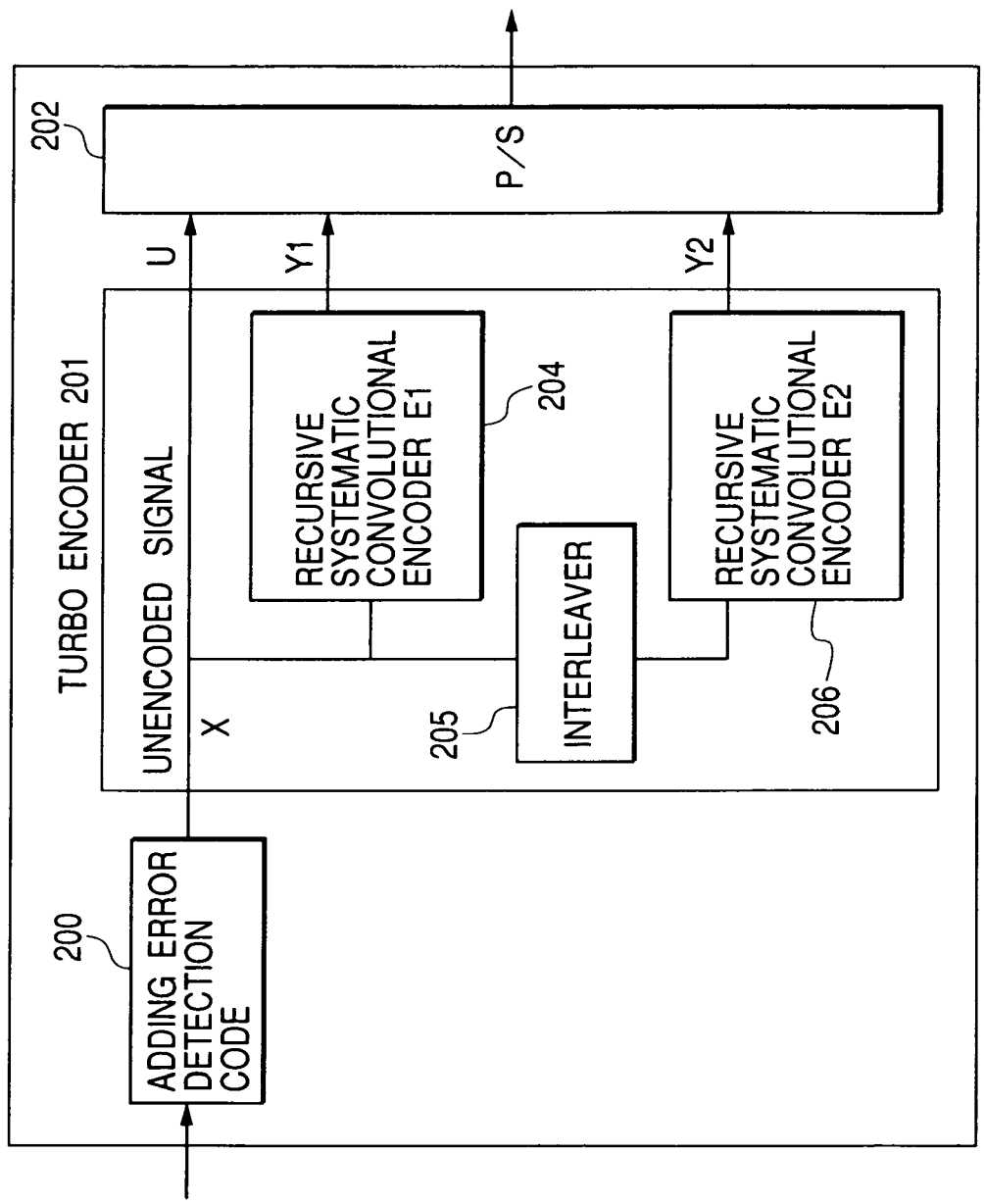
FIG. 14 shows a channel encoder configuration example in the present invention.

FIG. 14 shows a configuration example of the above channel encoder 100. The channel encoder shown in FIG. 14 uses turbo encoding. First, means for adding error detection code 200 adds error detection code to data to transmit. Then, the data to transmit is input to a turbo encoder 201 in which two recursive systematic convolutional encoders 204 and 206 and an interleaver 205 encode the data into code words U, Y1, and Y2 which are output from the turbo encoder. Moreover, a parallel-serial (P/S) converter 202 converts the code words into serial code words which are in turn output. At this time, it is desirable to perform interleaving the output bit sequences at the same time.

Figure 4:
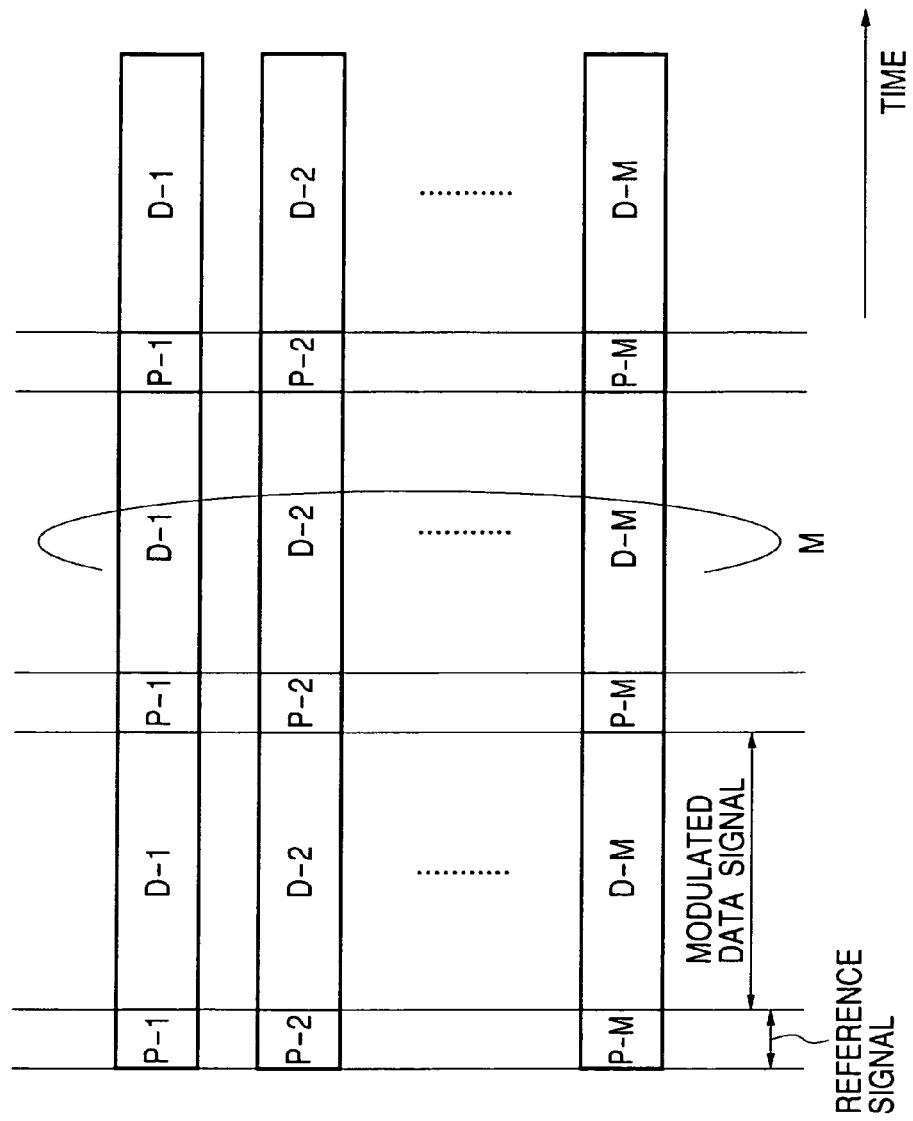
FIG. 4 shows a modulated signal format example in the present invention.

FIG. 4 shows the structures of the signals modulated by the modulators 101-1 through 101-M. The M units of modulated signals each contain data signals D-1 through D-M and reference signals P-1 through P-M which are inserted at given intervals. The data signals D-1 through D-M are generated by the data to transmit and change, according to the data to transmit. On the other hand, the reference signals P-1 through P-M are known signals determined by the system and used by the MIMO receiver 108 and demodulators 106-1 through 106-M at the receiving end as reference signals for demodulation.

Figure 7:
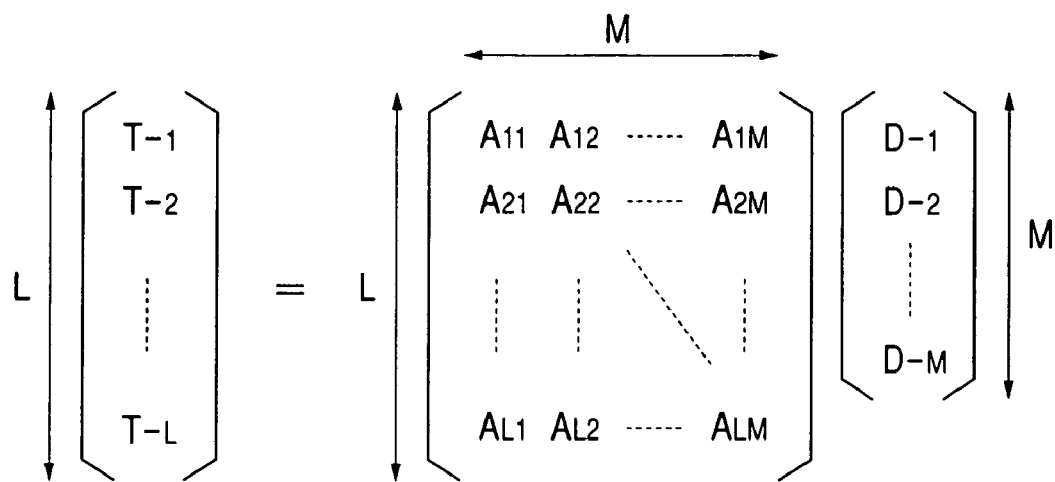
FIG. 7 is a diagram to explain the operation of a complex matrix operation unit in the present invention.

FIG. 7 explains the operation of the above complex matrix operation unit 109. The modulated signals D-1 through D-M (P-1 through P-M) are multiplied by the complex matrix [A] which consists of M×L units of complex factors and thereby L units of complex signals T-1 through T-L are obtained. For this operation, the complex matrix [A] must be obtained. If the modulated signals D-1 through D-M (P-1 through P-M) are separately beam formed in the same concept as for adaptive array antennas, the vectors of the columns in the resultant matrix [A] have a same value. As a result, it becomes impossible to separate D-1 through D-M (P-1 through P-M) at the receiving end. Thus, the conventional beam forming concept cannot be applied to obtaining the matrix [A]. It is desirable to determine the complex matrix [A] in the present invention so as to maximize channel capacity to be achieved C=log2 (det (I+(Ps/Pn) (HS) (HA)^h)). Here, det ( ) denotes determinant, Ps denotes average power for the M units of transmit signals, Pn denotes average received noise power, I denotes identity matrix, and ( )^h denotes complex conjugate transposition of the matrix. H can be expressed with a complex matrix of L×N units which is a propagation matrix between the L units of transmitting antennas and the N units of receiving antennas. As a concrete method of obtaining the matrix A for maximizing C, a commonly used maximizing algorithm with a non-linear function of several variables should be used, constrained by that Σ (Aij)^2 (i=1 to L, j=1 to M) be a constant value. Σ (Aij)^2 is to be constant because the transmitting power must be set constant. To obtain the matrix H which is information about the MIMO propagation channels, the most conceivable way is posting results of observing the channels at the receiving end to the transmitting end. However, if bidirectional communication channels exist, one for transmission and the other for reception, it is also possible to derive the propagation channels matrix H by observing the signals in the backward direction. If no reliable information about the propagation channels matrix H can be obtained, it is possible to generate the matrix [A] randomly. In this case, the beam forming effect of the adaptive array antennas cannot be obtained, but only the effect of transmitting diversity is obtained.

Figure 8:
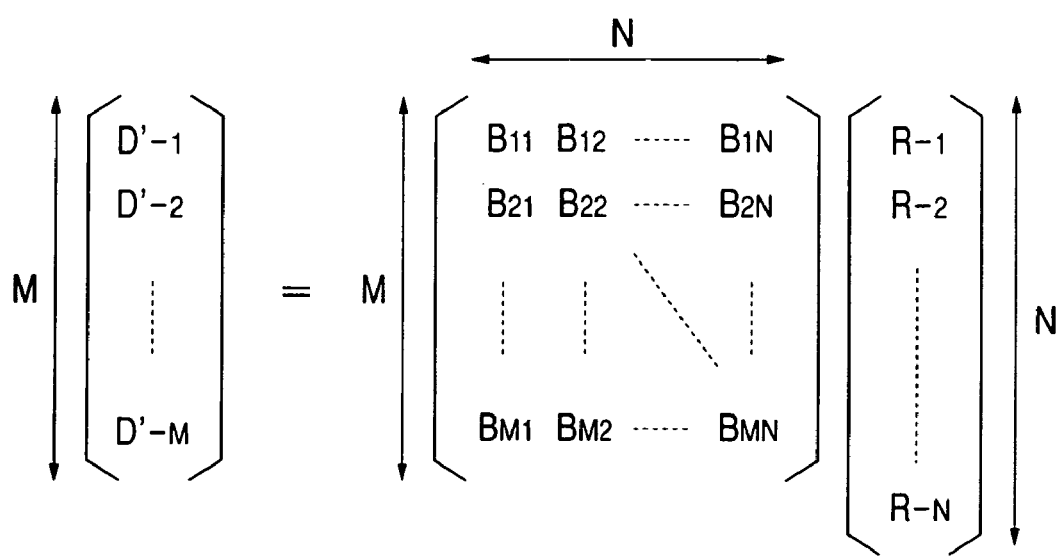
FIG. 8 is a diagram to explain the operation of a MIMO receiver in the present invention.

FIG. 8 explains the operation of the above MIMO receiver 108. The received signals R-1 through R-N from the N units of receiving antennas 104-1 through 104-N are multiplied by the N x M complex matrix [B] and thereby M units of signals D'-1 through D'-M output from the MIMO receiver are obtained. Here, the complex matrix [B] is constituted to separate the M units of modulated signals which were mixed together in the complex matrix operation unit at the sending end and through the propagation channels. Specifically, the matrix [B] should be determined to match as closely as possible with the known signals which must have been transmitted as the reference signals P-1 through P-M shown in the above FIG. 4. To do this, a Minimum Mean Square Error (MMSE) algorithm which minimizes the noise and interference effects should be applied.

Figure 15:
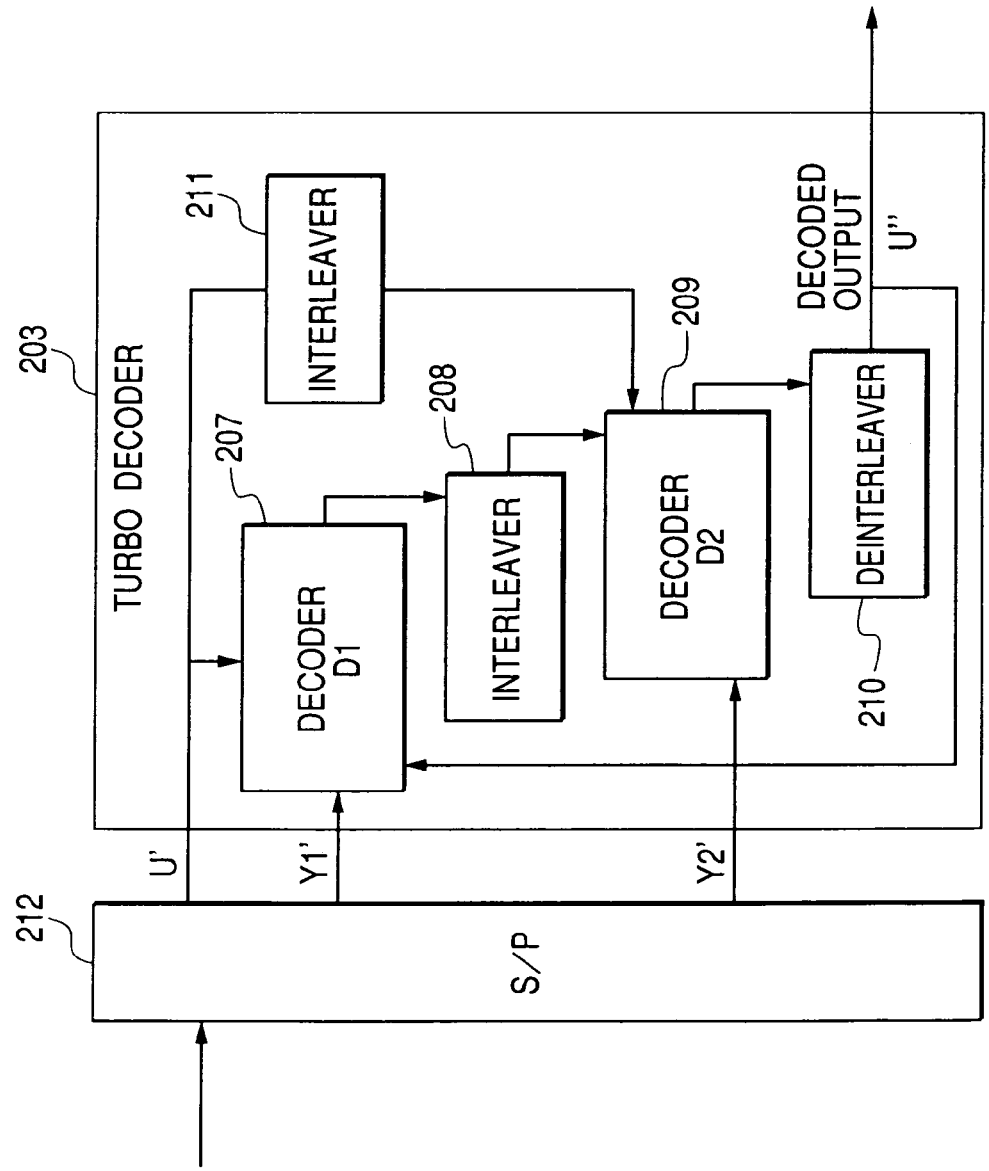
FIG. 15 shows a channel decoder configuration example in the present invention.
Figure 16:
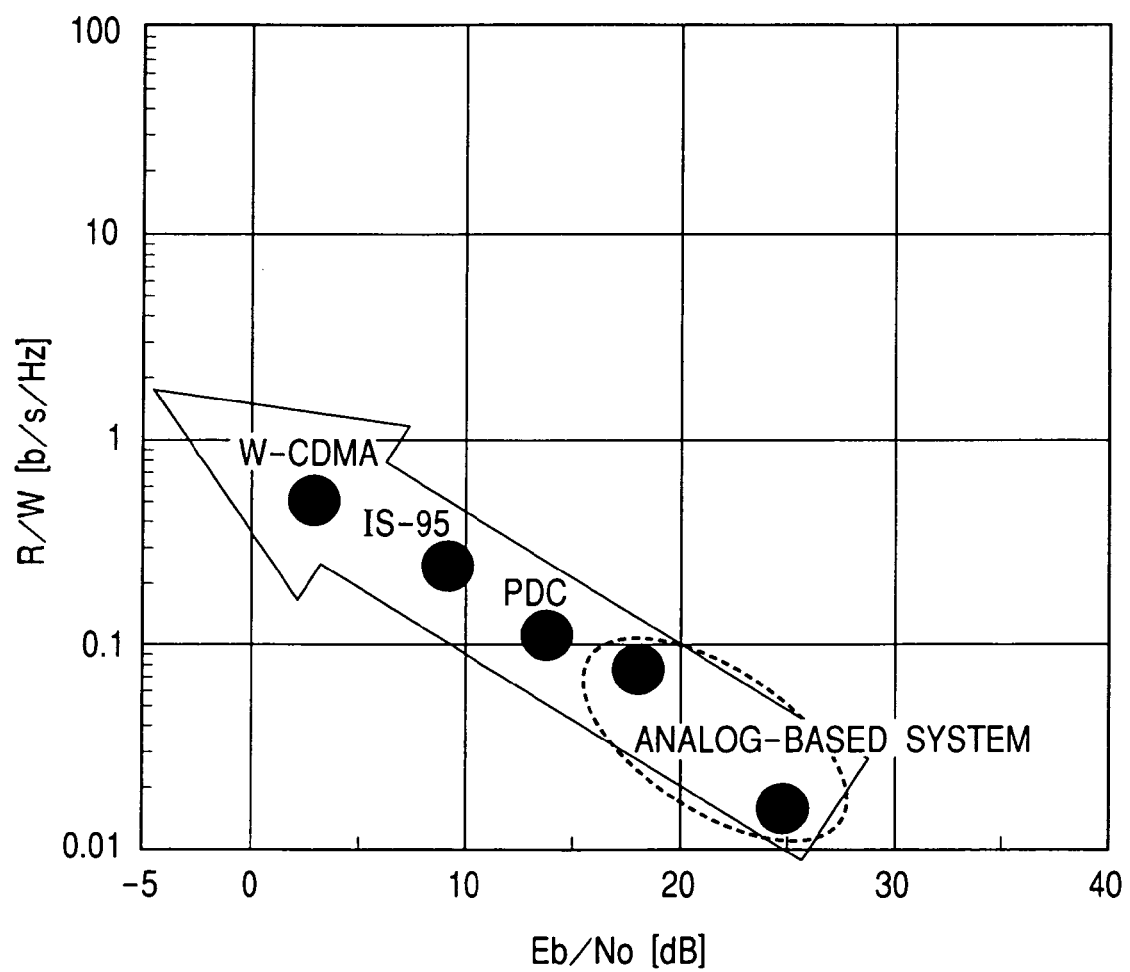
FIG. 16 is a graph of spectrum efficiency by the heretofore adopted mobile communication systems.
Figure 17:
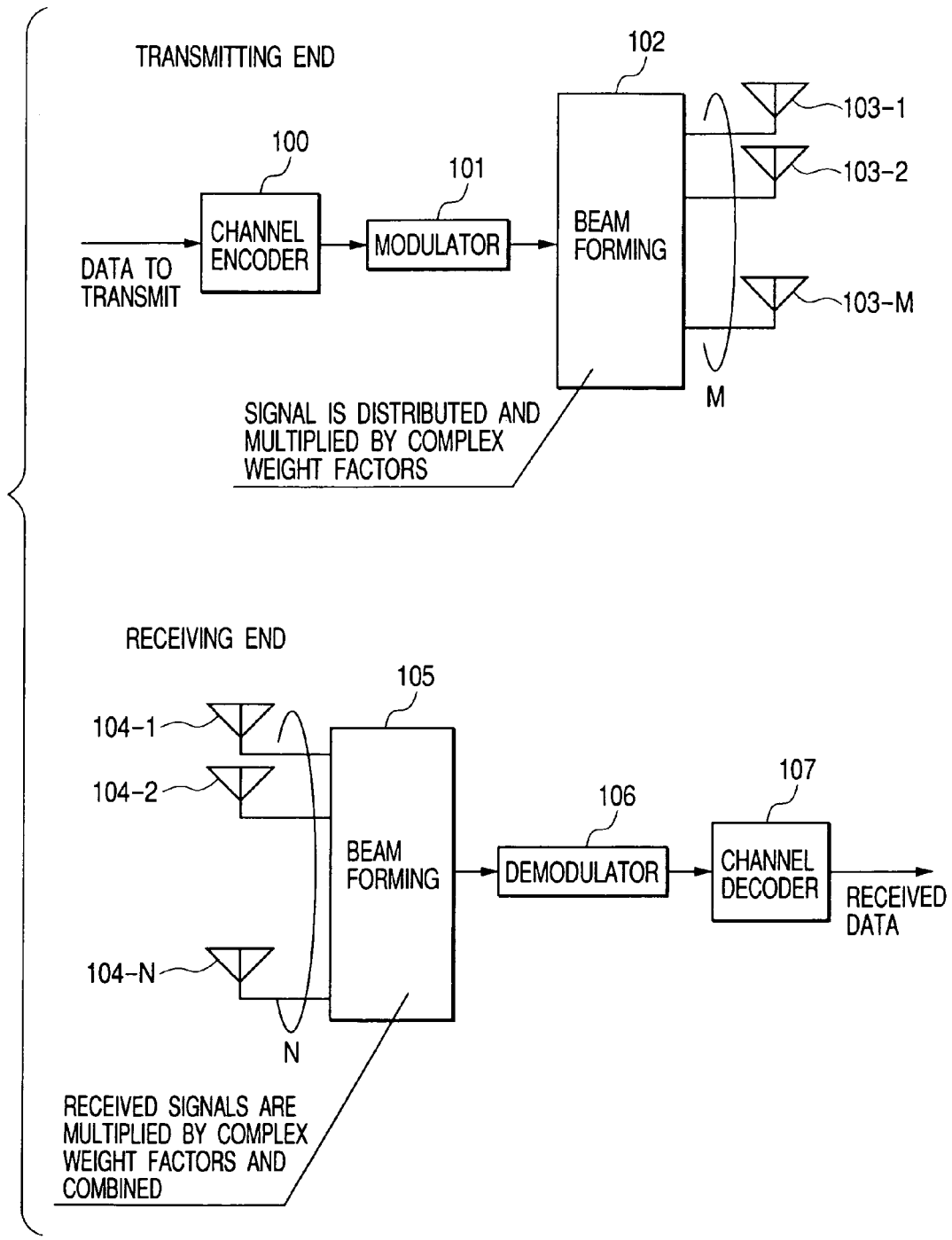
FIG. 17 shows configuration examples of transmitting and receiving modules using adaptive array antennas (prior art example 1)
Figure 18:
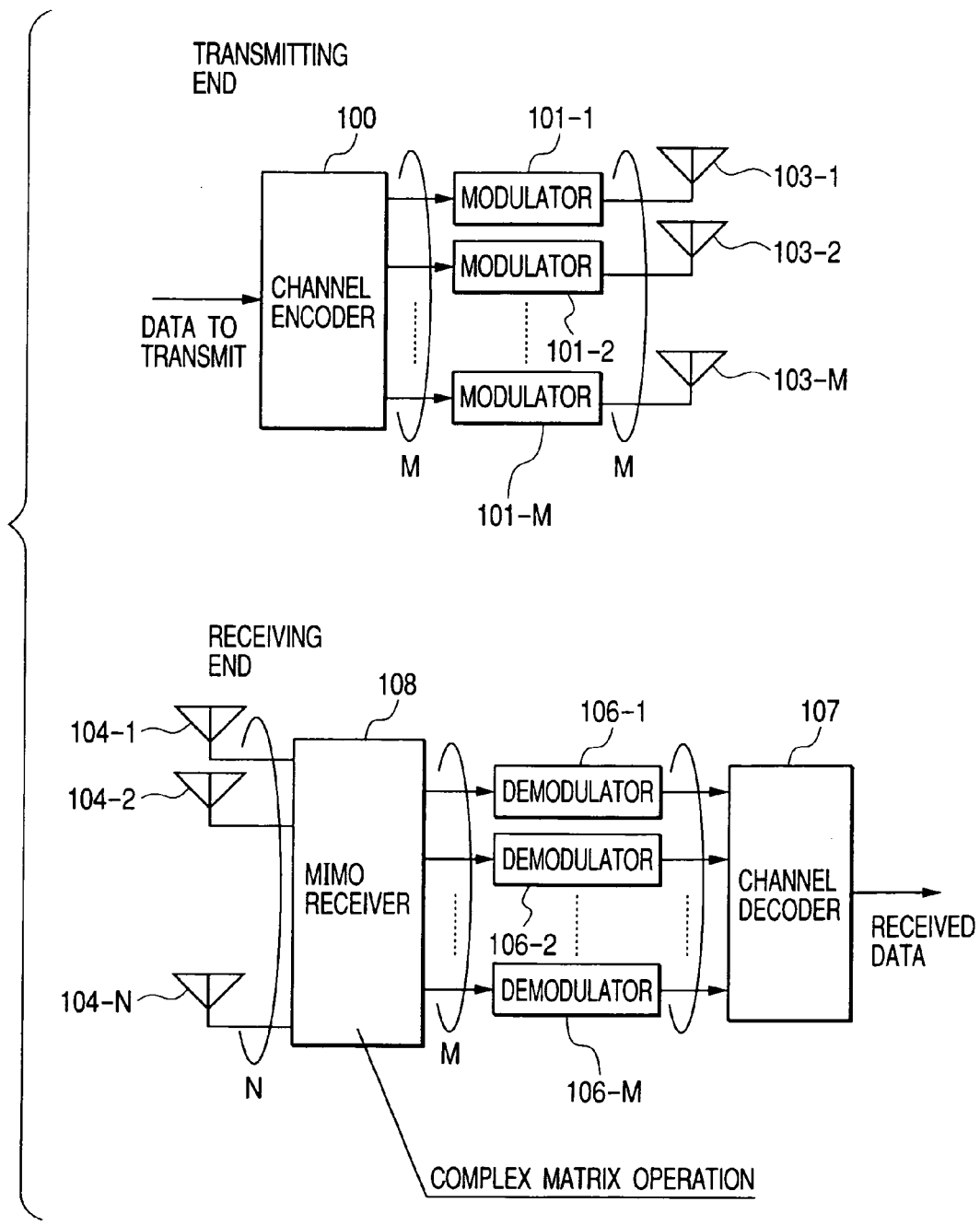
FIG. 18 shows configuration examples of transmitting and receiving modules using MIMO channels (prior art example 2).

FIG. 15 shows a configuration example of the above channel decoder 107. A series of received signals demodulated by the demodulators 106-1 through 106-M is separated into U', Y1', and Y2' by a serial-parallel (S/P) converter 212 and the U', Y1', and Y2' signals are decoded by a turbo decoder 203 and decoded results U'' are output. As the signals are decoded by repeated decoding through a series of decoders 207, 209, interleavers 208, 211, and a deinterleaver 210, receiving errors involved in the signals are corrected. If the channel encoder at the sending end performs interleaving of output bit sequences, the above serial-parallel (S/P) converter 212 also performs corresponding deinterleaving.

Figure 1:
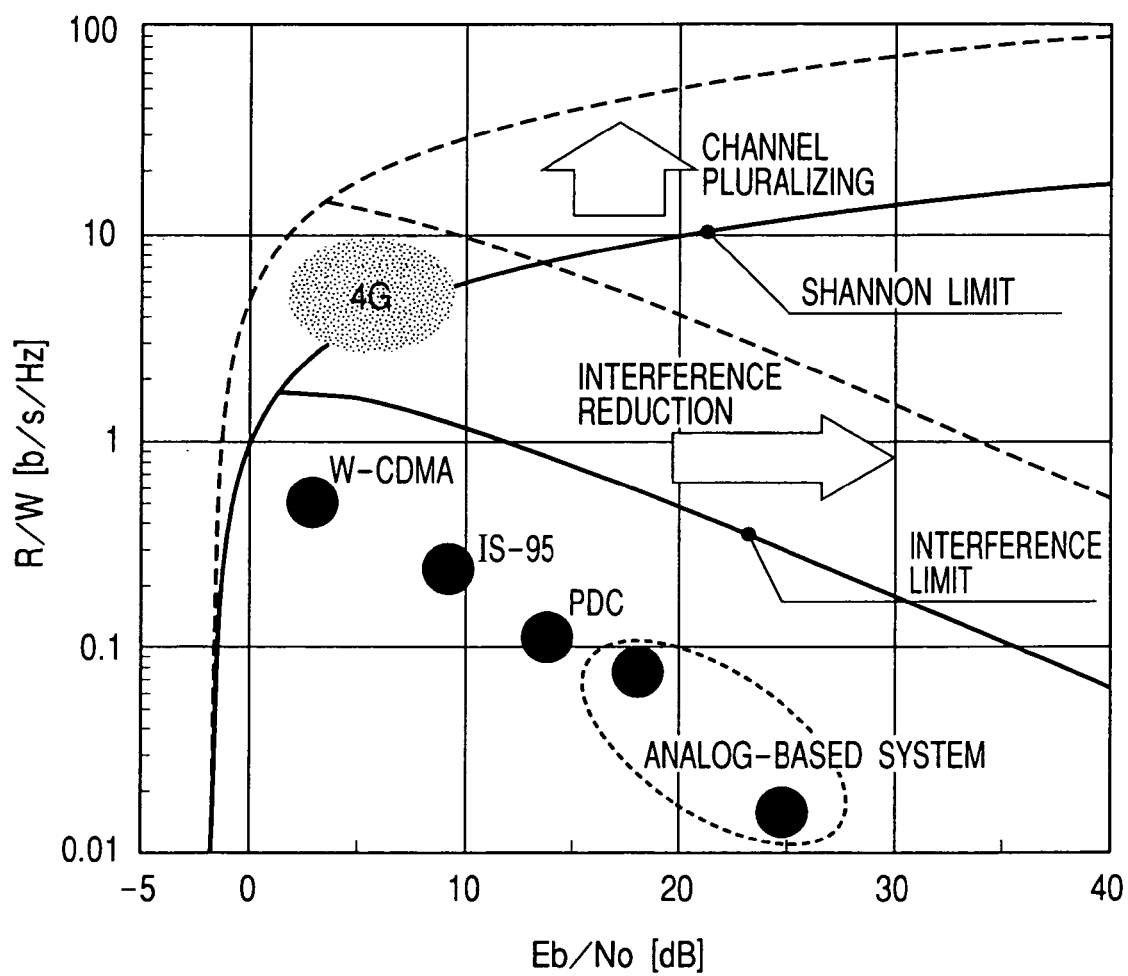
FIG. 1 is a graph representing spectrum efficiency and system operation limitation.

The mobile communication system according to the above-described Embodiment 1 of the invention can take advantage of both the channel pluralizing effect by using the MIMO channels and the interference reduction effect by using the adaptive array antennas and provides the data transmission method for mobile communication in which the spectrum efficiency was improved greatly as indicated by a "4G" point indicated in FIG. 1. However, according to the conditions of the propagation channels, the operation at the target point level is not always achieved. For example, if the vectors of the rows in the propagation channels matrix H of the MIMO propagation channels comes to have stronger interrelations and the parallellity of the channels, in other words, the number of parallel channels decreases, then components are weighted on the vectors of some of the columns in the matrix A and the channel pluralizing effect is reduced. In such cases, conversely, the beam forming effect becomes easy to obtain and, consequently, the interference reduction effect becomes greater. It is therefore desirable to shift the operation point in FIG. 1 to the right, that is, to increase Eb/No. This can be accomplished by increasing the number of modulation levels and/or decreasing the redundancy by increasing the encoding rate.

Figure 3:
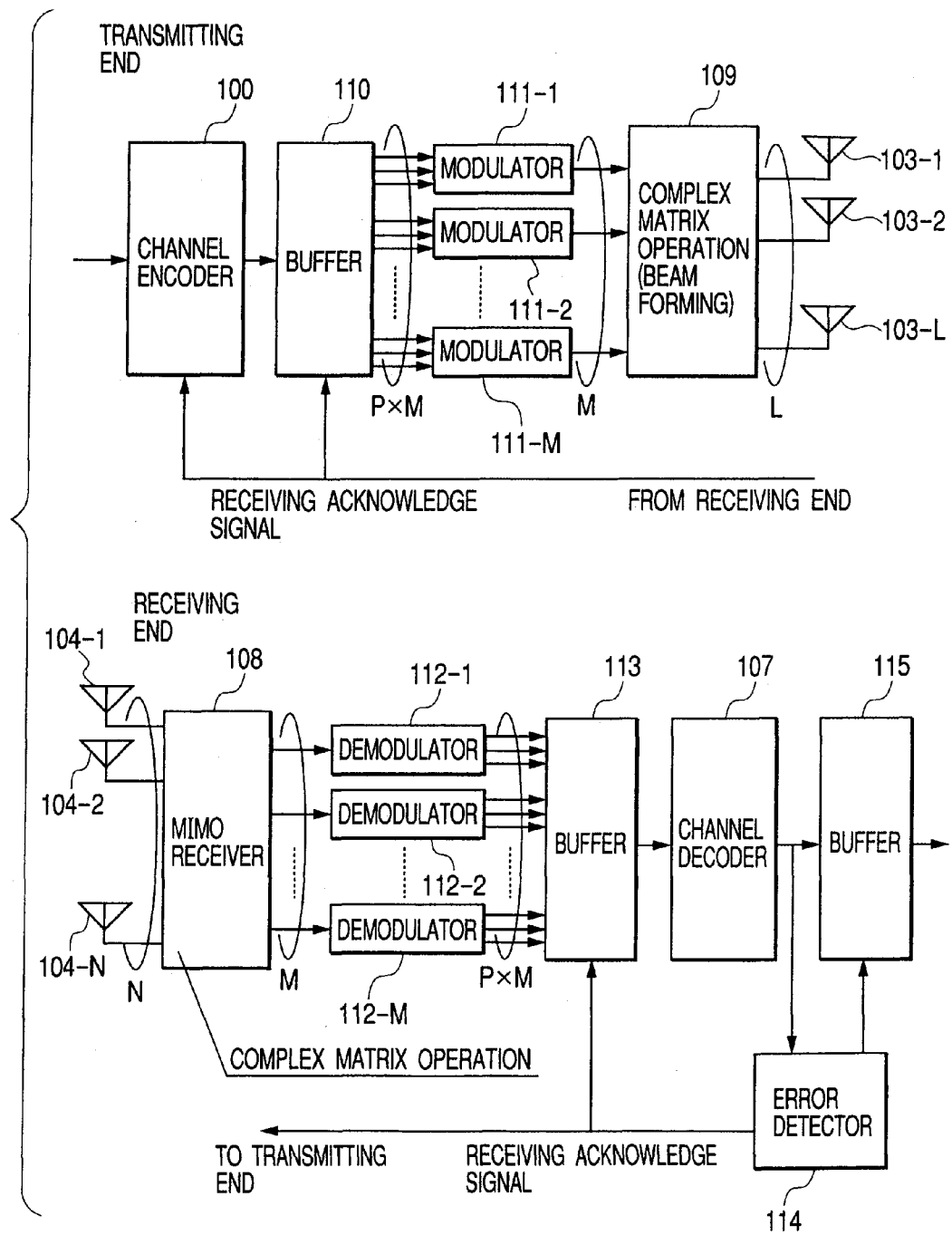
FIG. 3 is a diagram showing the configurations of transmitting and receiving modules in a mobile communication system according to a preferred Embodiment 2 of the present invention.

Next, FIG. 3 shows the configurations of transmitting and receiving modules in a mobile communication system according to a preferred Embodiment 2 of the present invention. The channel encoder 100, complex matrix operation unit 109, transmitting antennas 103-1 through 103-L, receiving antennas 104-1 through 104-N, MIMO receiver 108, and channel decoder 107 operate the same as described in Embodiment 1. In Embodiment 2, a channel encoded code word is temporarily stored into a buffer 110. The code word bits stored in the buffer 100 are read sequentially and modulated by modulators 111-1 through 111-M. For modulation, it is desirable to modulate a plurality of bits simultaneously by multilevel modulation such as Quadrature Amplitude Modulation (QAM). Reading the code word bits from the buffer 110 and modulating them are repeated until a receiving acknowledge signal has been returned from the receiving end. At the receiving end, signals (received symbols) output from the MIMO receiver 108 are respectively demodulated by demodulators 112-1 through 112-M corresponding to the modulators 111-1 through 111-M at the transmitting end and demodulated signals are sequentially stored into a buffer 113. The buffer 113 outputs the received signals stored therein which are a part of an encoding unit to the channel decoder 107 even before the reception of the encoding unit is complete, and decoding is tried. An error detector 114 checks the decoded results, using the error detection code which was added at the transmitting end and notifies the transmitting end of the result of the check. When it is detected that the signals in one coding unit have been received correctly without errors, the buffer 113 is cleared and becomes ready for the next coding unit. A buffer 15 stores the decoded signals which are sequentially overwritten with the signals decoded by the channel decoder 107 and output them as received signals when it is notified of correct reception from the error detector 114.

Figure 9:
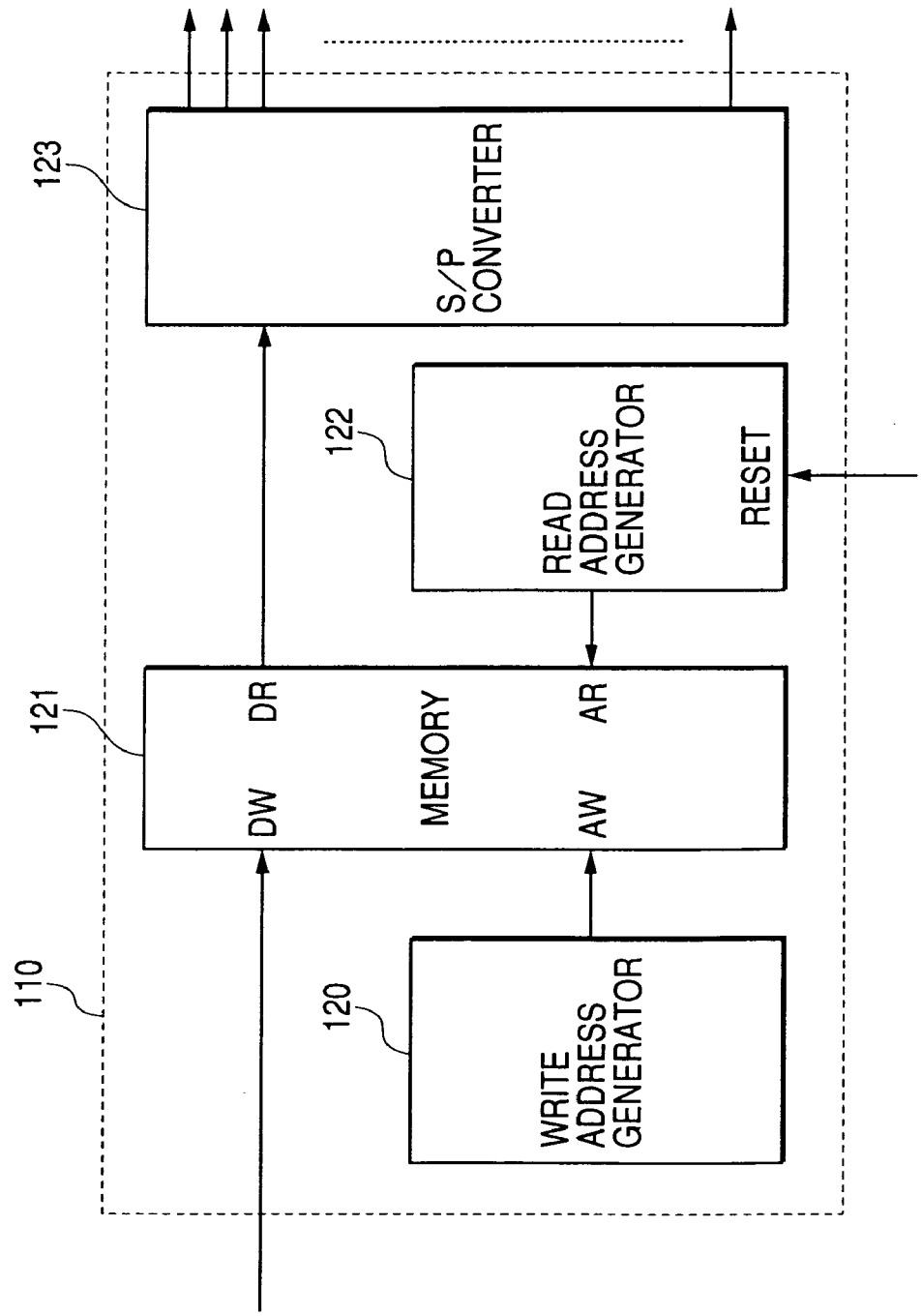
FIG. 9 shows a configuration example of a buffer at the transmitting end according to Embodiment 2 of the present invention.

FIG. 9 shows a configuration example of the buffer 110. Code words in one unit of encoding output from the encoder 100 are sequentially written into the memory 121, according to address generated by a write address generator 120. On the other hand, the written code words are sequentially read from the memory, according to address generated by a read address generator 122, parallelized by a serial-parallel (S/P) converter 123, and supplied to the above modulators 111-1 through 111-M. If a receiving acknowledge signal is not returned from the receiving end after whole of code word of coding unit has been sent to the modulators, then the code word stored in the memory 121 is read again and re-sent to the modulators. At this time, it is desirable to change the sequence of the addresses generated by the read address generator 122. Thereby, signal quality difference per bit of the code word can be equalized.

Figure 5:
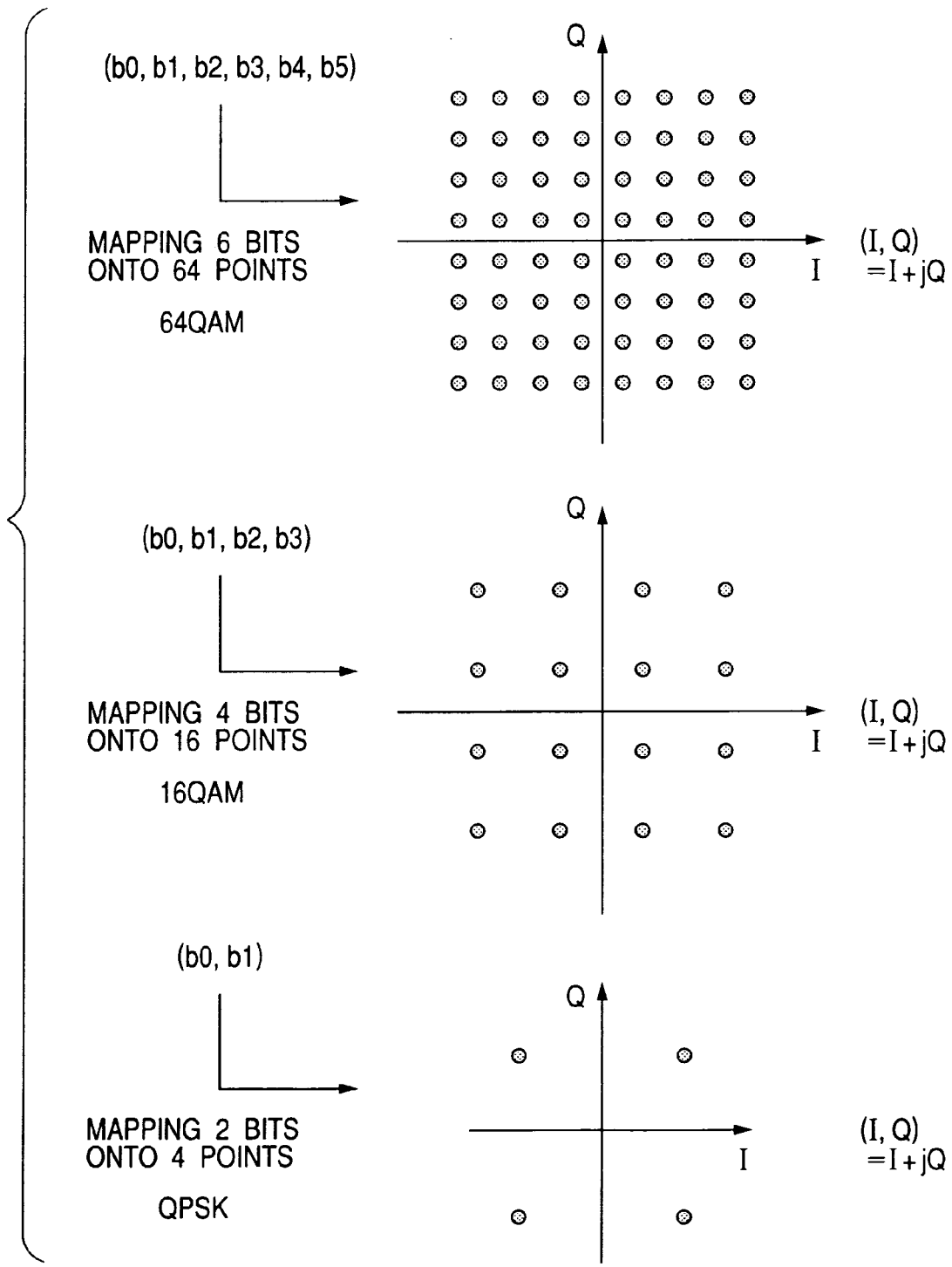
FIG. 5 is a diagram to explain the operation of modulators in the present invention.

FIG. 5 explains the operation of the above modulators 111-1 through 111-M. The top matrix is 64QAM mapping, the middle one is 16QAM mapping, and the bottom one is QPSK mapping. In the 64QAM mapping, for a set of six bits (b0, b1, . . . , b5), 64 bit combinations are mapped onto 64 points on the IQ complex plane and output signal I+jQ (modulated symbol) is obtained. Similarly, in the 16QAM mapping, mapping four bits (b0, b1, b2, b3) onto 16 points is performed. In the QPSK mapping, mapping two bits (b0, b1) onto four points is performed.

FIG. 6 explains the operation of the demodulators 112-1 through 112-M. FIG. 6 explains a principle of how a 16QAM modulated signal is demodulated and the same principle applies to other modulation schemes. Four bits (b0, b1, b2, b3) are demodulated as follows. For b0, among modulated signal points with b0=0, a point nearest to a received signal point (received symbol) marked with a square point in the figure is selected and its distance L00 from the received signal point is measured. Similarly, among modulated signal points with b0=1, a point nearest to the received signal point is selected and its distance L00 from the received signal point is measured. From these results, L002-L012 is output as likelihood of received signal b0 and b0 is demodulated. For b1 to b3, the same operation is performed.

Figure 10:
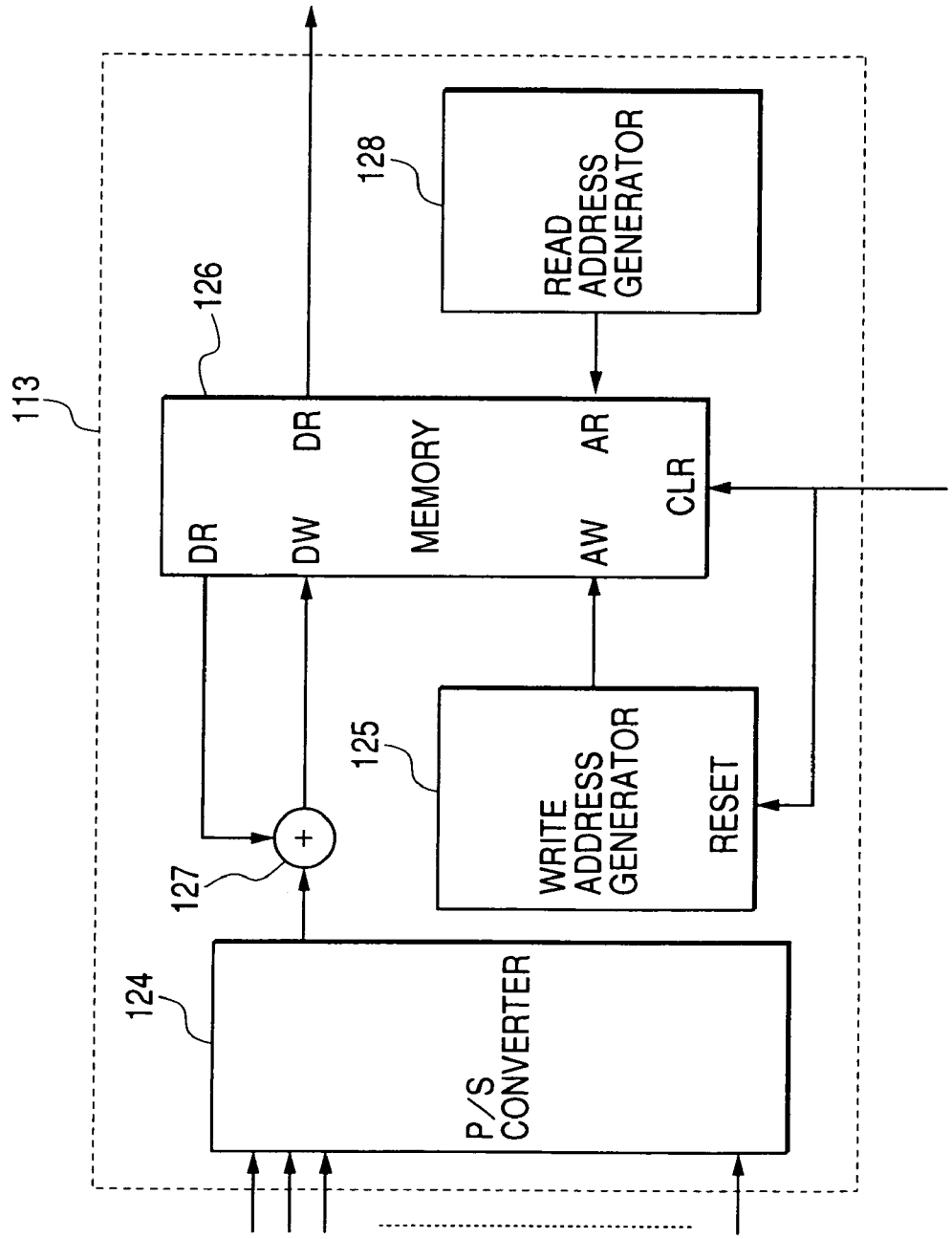
FIG. 10 shows a configuration example of a buffer at the receiving end according to Embodiment 2 of the present invention.

FIG. 10 shows a configuration example of the above buffer 113. The signals demodulated by the above demodulators 112-1 through 112-M are converted into a sequence of the demodulated signals by a parallel-serial (P/S) converter 124. Meanwhile, the demodulated signals of the same code word received so far are read from the memory 126, according to address generated by a write address generator 125, added to the sequence of the demodulated signals output from the above parallel-serial (P/S) converter 124 in an adder 127, and stored again into the memory 126. The demodulated signals stored in the memory 126 which are a part of an encoding unit are read from the memory 126, according to a read address generator 126, and sent to the channel decoder 107, even before the reception of the encoding unit is complete. When the error detector 114 detects that the code word has been decoded without errors and supplies a decoding complete signal to the buffer, the memory 126 and the write address generator 125 are initialized and become ready for receiving the next code word. As a matter of course, the write address generator 125 and the read address generator 128 shown in FIG. 10 must have inverse relation to the write address generator 120 and the read address generator 122 shown in the above FIG. 9.

Figure 11:
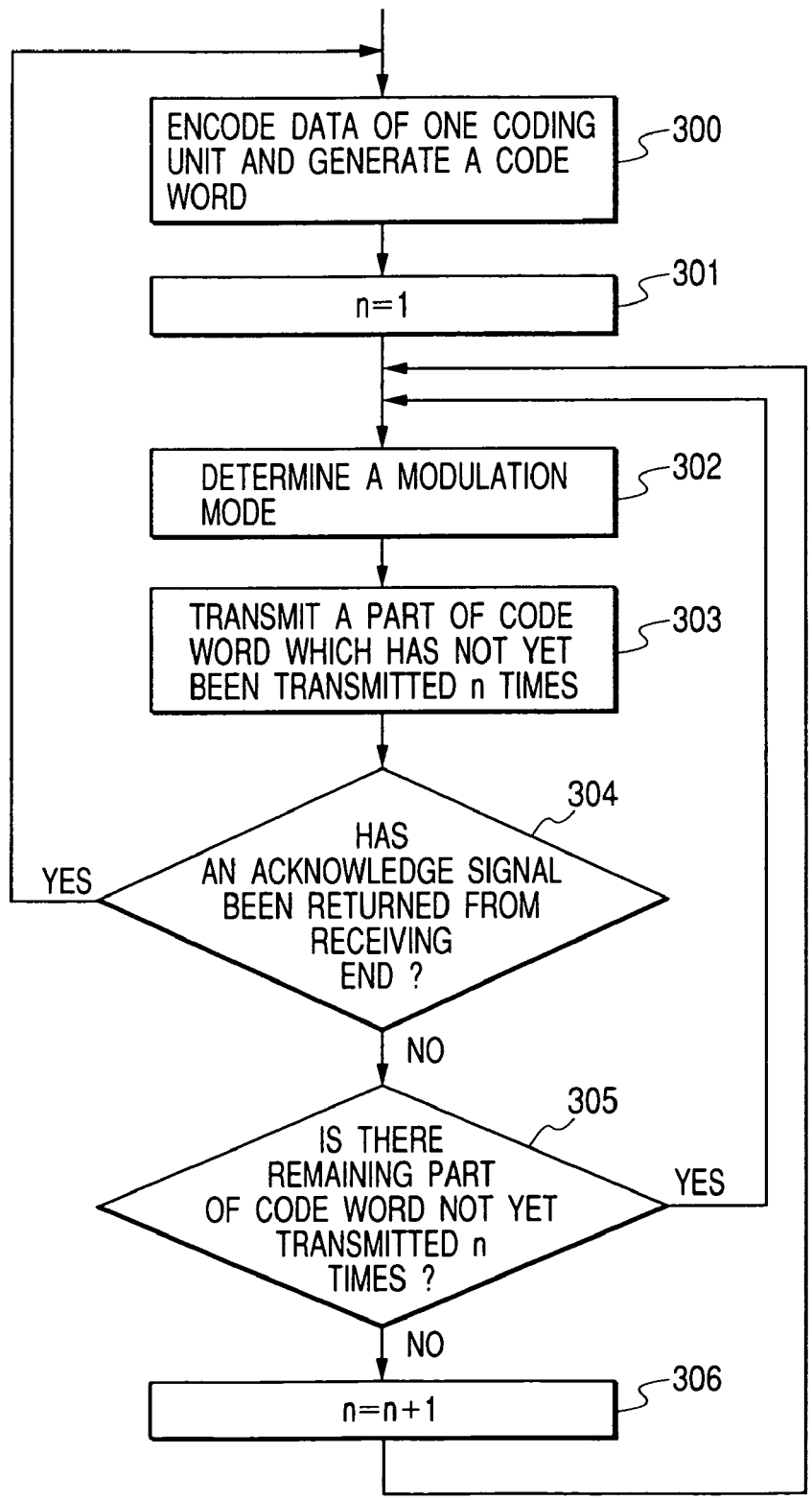
FIG. 11 is a flowchart of operation flow at the transmitting end in Embodiment 2 of the present invention.
Figure 12:
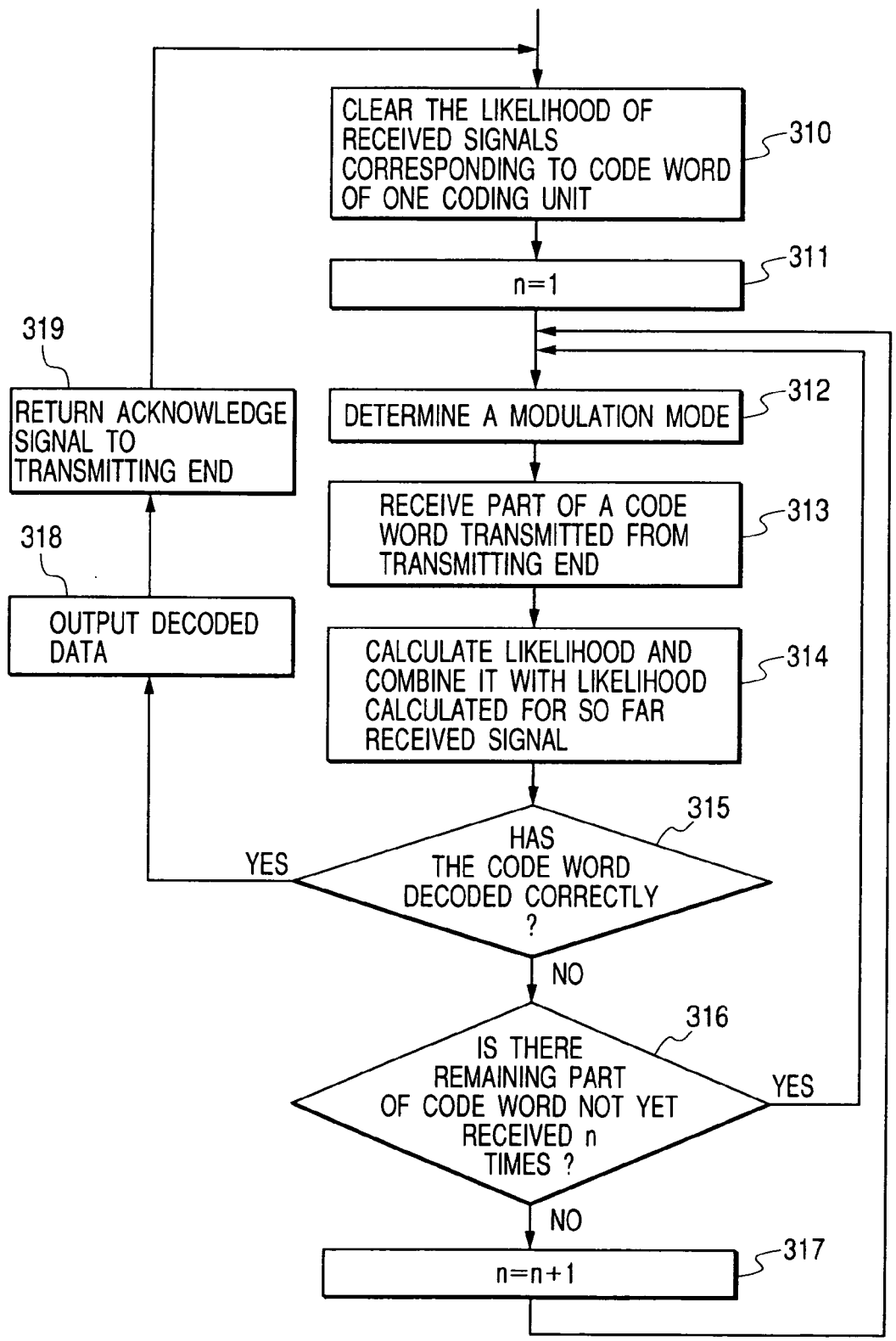
FIG. 12 is a flowchart of operation flow at the receiving end in Embodiment 2 of the present invention.
Figure 13:
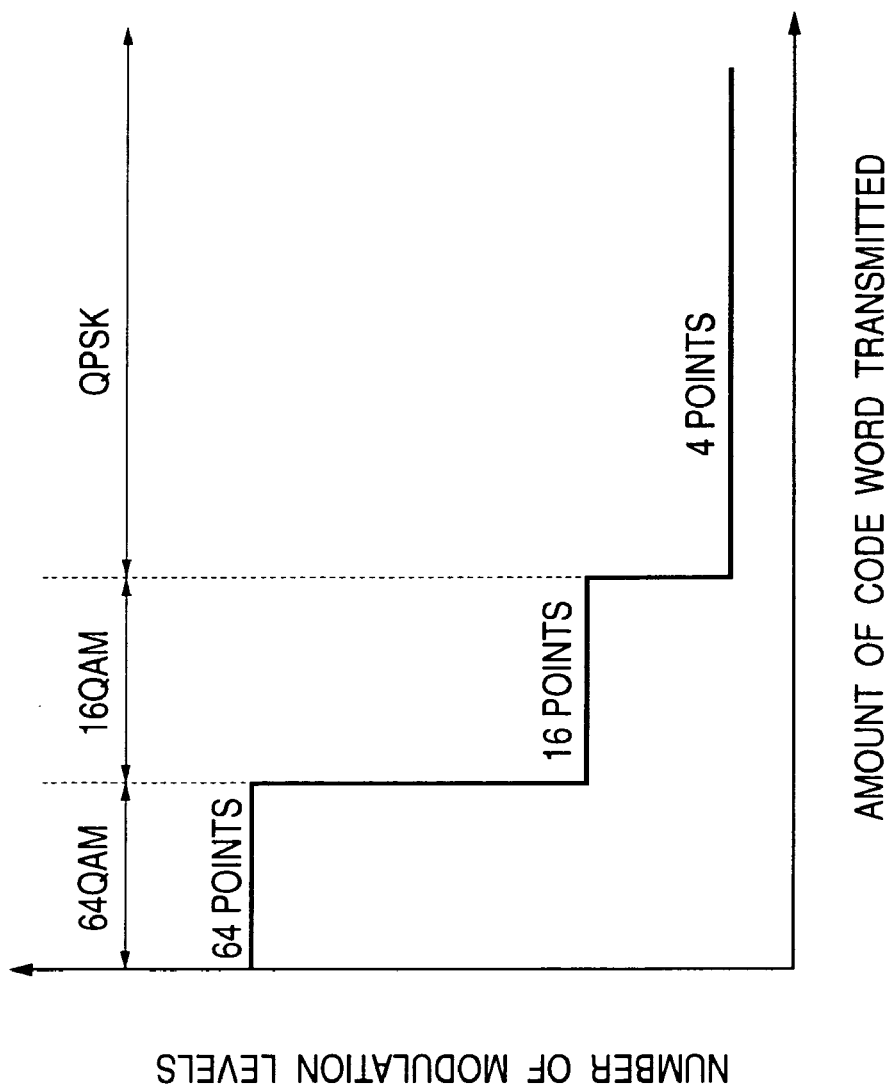
FIG. 13 shows an example of control for the number of modulation levels in Embodiment 2 of the present invention.

The operation flow at the transmitting end in Embodiment 2 is explained in FIG. 11 and the operation flow at the receiving end is explained in FIG. 12. At the transmitting end, the first step is encoding data in one unit of encoding and generating a code word (300). Then, a transmission count variable n is initialized to 1 (301). A modulation mode to be performed by the modulators 111-1 through 111-M is determined, according to the channel conditions (302). Part of the cord word which has not yet been transmitted n times is modulated and transmitted (303). If an acknowledge signal is returned from the receiving end, the procedure returns to step 300 and the next code word is generated. If not, the procedure returns to step 302 and the remaining part of the code word is transmitted. When the transmission of the code word has been completed for the nth time, the variable n is incremented by one (306) and the code word is transmitted again. At the receiving end, in advance of receiving, the first step is clearing the likelihood of received signals corresponding to a code word in one coding unit (310). Then, a reception count variable n is initialized to 1 (311). A modulation mode which corresponds to a demodulation mode to be performed by the demodulators 112-1 through 112-M is determined, according to the channel conditions (312). Part of a code word received is demodulated and the likelihood of the demodulated signal is combined with the likelihood calculated for so far received signal (313, 314). Using the so far demodulated signals, it is judged whether the data in the whole of coding unit have been decoded correctly (315). If the data in the whole of coding unit have been decoded, the decoded data is output (318), the acknowledge signal is returned to the transmitting end (319), and the procedure returns to step 310. If the data in the whole of coding unit have not been decoded correctly, demodulation of received signals is continued (316, 317). Here, when determining a modulation mode, by referring to instantaneous channel quality, it would be reasonable to select a modulation mode with a great number of modulation levels if the quality is good; otherwise, select a modulation mode with a small number of modulation levels if the quality is poor. More simply, as is show in FIG. 13, it may also be preferable to determine a modulation mode according to how much part of the code word or amount of code word has been transmitted so far. Based on the principle according to FIG. 13, modulation levels can be controlled simply. If transmission is completed with small parts of code word, then it would be equivalent to achieving the transmission with a high number of modulation levels on average. The equivalent number of modulation levels actually decreases as the portions of code word transmitted increases. That transmission is completed with small portions of code word means propagation channel quality is good. If the transmission of greater portions of code word is needed, it means propagation channel quality is poor. Modulation level control based on the principle according to FIG. 13 can be expected to produce the effect equivalent to modulation mode change control according to propagation channel conditions.

According to Embodiment 2, time required to transmit one unit of encoding automatically changes, according to propagation channel conditions, and, as a result, the operation point indicated in FIG. 1 would have been controlled appropriately. However, if the number of parallel transmission channels as the MIMO propagation channels decreases, it is desirable to increase the number of modulation levels and the encoding rate as is the case for Embodiment 1. In the present embodiment 2, the transmission of a code word continues until the receiving end acknowledges the code word reception and, consequently, the encoding rate is controlled appropriately. For instance, if decoding of only part of a code word transmitted is successful, redundant code word transmission is avoided and the encoding rate is high. For instance, if code word decoding is successful only after repeated transmission of the code word, the encoding rate is low. Meanwhile, it is desirable to control the number of modulation levels in the same manner as in Embodiment 1. Specifically, if the number of parallel transmission channels as the MIMO propagation channels decreases, it is desirable to increase the number of modulation levels. This is, in effect, equal to controlling a threshold in changing modulation mode if in use with modulation level control according to FIG. 13. If the number of parallel transmission channels as the MIMO propagation channels decreases, the threshold in the number of code words to be transmitted should be set high so as to reduce the number of modulation levels.

What is claimed is:

1. A mobile communication system comprising:
a transmitting station; and
a receiving station,
wherein said transmitting station comprises:
an encoder which encodes a transmit signal; and
a modulator which modulate the transmit signal output from the encoder, separates the modulated transmit signal into M units of modulated signals ($2 \leq M$), and
an operation unit which multiplies M units of modulated signals separated and output from said modulator by a complex matrix consisting of M×L units of elements, and performs beam forming of the M units of modulated signals;
a plurality of antennas which transmit L units of beam formed transmit signals ($2 \leq L$), and
wherein said receiving station comprises:
a plurality of antennas which respectively receive the signals transmitted from said plurality of antennas of said transmitting station;
a Multiple-Input Multiple-Output (MIMO) receiver which separates said plurality of signals from the signals input from said plurality of antennas;
a demodulator which demodulates the plurality of signals output from said MIMO receiver; and
a decoder which decodes said plurality of demodulated signals.

2. The mobile communication system according to claim 1, wherein said complex matrix is settled according to conditions of propagation channels between the plurality of antennas of said transmitting station and the plurality of antennas of said receiving station.

3. The mobile communication system according to claim 1, wherein said transmitting station has the modulator and L units of antennas, and
wherein said modulator comprises a serial-parallel converter at an output, and modulates the transmit signal serially into M unit of modulated signals.

4. The mobile communication system according to claim 1, wherein said transmitting station has the plurality of modulators and L units of antennas, and
wherein said modulator comprises a serial-parallel converter at an output, and modulates the transmit signal serially into M units of modulated signals.

5. A transmitting station which transmits data to a receiving station having a plurality of antennas, said transmitting station comprising:
an encoder which encodes a transmit signal;
a modulator which modulates the transmit signal output from the encoder, and separates the modulated transmit signal into M units of modulated signals ($2 \leq M$);

an operation unit which multiplies M units of modulated signals separated and output from said modulator by a complex matrix consisting of M×L units of elements, and performs beam forming of the M units of modulated signals; and L units of antennas which transmit L units of beam formed transmit signals ($2 \leq L$).

6. The transmitting station according to claim 5, wherein said complex matrix is settled according to conditions of propagation channels between the plurality of antennas of said transmitting station and the plurality of antennas of said receiving station.

7. The transmitting station according to claim 5,
wherein said transmitting station has the modulator and L units of antennas, and
wherein said modulator comprises a serial-parallel converter at an output, and modulates the transmit signal serially into M units of modulated signals.

8. The transmitting station according to claim 5,
wherein said transmitting station has the plurality of modulators and L units of antennas, and
wherein said modulator comprises a serial-parallel converter at an output, and modulates the transmit signal serially into M unit of modulated signals.

9. A transmitting station for transmitting data to a receiving station having a plurality of antennas, said transmitting station comprising:
a modulator which modulates a transmit signal output which is encoded from an encoder;
an operation unit which multiples $M(2 \leq M)$ units of the modulated transmit signal and output from said modulator by a complex matrix consisting of $M \times L(2 \leq L)$ units of elements, and performs beam forming of the M units of the modulated transmit signal; and
a plurality of antennas which transmit L units of beam formed transmit signals ($2 \leq L$).

* * * * *